(12) United States Patent
Warraiat

(10) Patent No.: US 12,107,987 B2
(45) Date of Patent: Oct. 1, 2024

(54) SMARTPHONE PRIVACY DEVICE

(71) Applicant: Laith Warraiat, Wellington, FL (US)

(72) Inventor: Laith Warraiat, Wellington, FL (US)

( * ) Notice: Subject to any disclaimer, the term of this patent is extended or adjusted under 35 U.S.C. 154(b) by 0 days.

(21) Appl. No.: 17/815,974

(22) Filed: Jul. 29, 2022

(65) Prior Publication Data

US 2023/0072301 A1 Mar. 9, 2023

Related U.S. Application Data

(60) Provisional application No. 63/241,311, filed on Sep. 7, 2021.

(51) Int. Cl.
*H04M 1/72463* (2021.01)
*H04M 1/7246* (2021.01)

(52) U.S. Cl.
CPC ..... *H04M 1/72463* (2021.01); *H04M 1/7246* (2021.01)

(58) Field of Classification Search
CPC ........... H04M 1/72463; H04M 1/7246; H04M 1/0206; H04M 1/0264; H04M 1/12; H04M 1/0235; H04M 1/0268; H04M 1/22; H04M 2260/52; H04B 1/3888; H05K 5/00; H05K 5/0004; H05K 5/03; A45C 2011/001; A45C 2011/002; A45C 2011/003; A45C 13/002; A45C 13/008; A45C 11/00; G06F 3/03545
See application file for complete search history.

(56) References Cited

U.S. PATENT DOCUMENTS

| 7,581,893 | B2 | 9/2009 | Miramontes | |
|---|---|---|---|---|
| 8,764,319 | B2 | 7/2014 | Oh et al. | |
| 9,241,051 | B1* | 1/2016 | Peterson, III | H04M 1/185 |
| 9,369,170 | B2 | 6/2016 | Sorrentino | |
| 9,813,100 | B1* | 11/2017 | Adams | A45C 11/00 |
| 2007/0212059 | A1 | 1/2007 | Karabinis et al. | |
| 2015/0163385 | A1* | 6/2015 | Haddad | G03B 17/565 |
| | | | | 348/374 |
| 2015/0320167 | A1* | 11/2015 | Nguyen | A45F 5/00 |
| | | | | 224/191 |
| 2019/0068768 | A1* | 2/2019 | Garg | H04M 1/04 |
| 2020/0321689 | A1* | 10/2020 | Witter | H04M 1/185 |
| 2021/0036729 | A1* | 2/2021 | Fong | H04M 1/724092 |
| 2022/0114287 | A1* | 4/2022 | DiSalvo | G06F 1/1679 |

* cited by examiner

*Primary Examiner* — Angelica Perez
(74) *Attorney, Agent, or Firm* — McHale & Slavin, P.A.

(57) ABSTRACT

A smartphone privacy device that attaches to a back side of a smartphone and does not inhibit smartphone operation. The privacy device employs a first hinged flap to obscure the front bottom microphone. A second hinged flap obscures the front top microphone and front facing camera. And a sliding shield obscures the rear top microphone and rear facing camera. The device allows selective openings of the flaps and shield. The smartphone privacy device erases any concern that a microphone or camera on a smartphone is listening or watching the user without the user's knowledge.

5 Claims, 8 Drawing Sheets

SMARTPHONE PRIVACY DEVICE

CROSS REFERENCE TO RELATED APPLICATIONS

In accordance with 37 C.F.R. § 1.76, a claim of priority is included in an Application Data Sheet filed concurrently herewith. Accordingly, the present invention claims priority to U.S. Provisional Patent Application No. 63/241,311, entitled "SMARTPHONE PRIVACY DEVICE", filed Sep. 7, 2021. The contents of which the above referenced application is incorporated herein by reference.

FIELD OF THE INVENTION

The field of the invention is directed to smartphone privacy and, in particular, to a device that attaches to a smartphone allowing selective isolation of cameras and microphones to limit audio input.

BACKGROUND OF THE INVENTION

In today's interconnected world, most everyone has a computer and/or a smartphone. Besides business use, home use of a computer may include an individual's most valuable information, such as financial records, credit card information, personal photos, bank information and the like. Smartphones have become indispensable tools for communication but add yet another complexity to the interconnected world by interfacing with an individual's home computer. Further, smartphones have created conveniences for the consumer, providing more effective communication, socialization, shopping, working efficiencies, and the like. The smartphone is becoming the preferred device for everyday communication since a smart phone is highly portable and may include access to the private information typically stored on a conventional computer. With the smartphone becoming the preferred choice of communication, serious privacy issues are of concern.

Everyone's privacy is susceptible to abuse from technologically advanced companies, governments, and other nefarious actors. Now that the consumer essentially places all their financial and social lives on smartphones, privacy is of upmost concern. Similar to a laptop or notebook computer, smartphones incorporate a camera, microphone and speaker, making them highly prone to nefarious actors who choose to spy on the unsuspecting user. There are existing software applications for smartphones that claim to protect the user's privacy, but such programs have varying degrees of success. Further, the user must trust vendor advertisement, as most users do not understand how the technologies operate.

The proliferation of smartphones with cameras and microphones has presented an opportunity for bad actors to spy on the smartphone operator. Countless articles exist detailing how a web camera has been accessed, allowing a party to see and hear the actions of the camera owner.

Further, loss of privacy may also be accidental through "butt" dialing a slang reference from instances wherein the smartphone is placed in a pocket of a user and a telephone call is accidently triggered by the body heat of the individual. The recipient of the call is able to hear what is transpiring around the smartphone, which may include a private conversation.

Countless articles exist detailing how a camera has been accessed, allowing someone to see the user through an open camera. For this reason, numerous camera covers exist for the purpose of preventing someone from watching the consumer by accessing the consumer's web camera. For instance, U.S. Pat. No. 9,369,170 discloses a protective case for a mobile device which has a body member removably disposed on the mobile device and covering at least a portion of at least one of the front face, the rear face, the top, bottom and two side edges of the mobile device and a movable lens cover disposed on the body member proximate to the first camera lens. The movable lens cover includes a first lens occlusion section and a first sensor access section. The movable lens cover can have at least two positions in relation to the mobile device. A fully exposed position exposes both the first camera lens and the at least one sensor, and a first partially occluded position disposes the first lens occlusion section over the first camera lens, preventing light from reaching the first camera lens and disposes the first sensor access section over the at least one sensor, allowing the at least one sensor to receive the input.

U.S. Pat. No. 8,764,319 discloses a protective case for a mobile device having a body for covering the rear face of the mobile device with a camera-exposing cutout provided at an edge of the body for exposing the camera lens of the mobile device, and a detachable lens cover comprising a slide cover and a plug-in cover, wherein the slide cover portion is configured to be slid into and along the two side edge portions of the camera-exposing cutout and cover the camera lens, wherein the plug-in cover is configured to be plugged into the camera-exposing cutout perpendicularly to a surface of the body and cover the camera lens.

U.S. Pat. No. 7,581,893 discloses a mobile phone having first and second camera lenses, and a U-shaped lens cover. The device body has a user side that faces the user, and an away side that faces away from the user during normal operations. The first camera lens faces the user and is housed on the user side of the device body. The second camera lens faces away from the user and is housed on the away side of the device body. The U-shaped lens cover is slide-ably attached to the device body and is able to move between three different positions. In the first position, also called the closed position, the U-shaped lens cover covers and protects both the first and second lenses. In the second position, only the facing lens is exposed. In the third position, only the away lens is exposed. The device automatically switches from a powered OFF state to a powered ON state when the U-shaped lens cover is slid from the first position to either of the second or third positions. The user is then free to use the device in a selected camera mode.

U.S. Patent Publication No. 2007/0212059 discloses a lens protecting apparatus for a cellular phone camera. The lens protecting apparatus includes a base, which has an opening, through which a lens of the camera is exposed, a coil, which is mounted to the base and is supplied with current, a lens cover, which is rotatably mounted to the base to open or close the opening, and a magnet, which is mounted to the lens cover to form a magnetic field around the coil. The magnet is moved by force generated by the current and the magnetic field, and the lens cover opens or closes the opening using the magnet to move it.

U.S. Pat. No. 9,241,051 discloses a case for enclosing a cell phone for selectively preventing access to the audio and video input of the cell phone by use of a front portion attached to a back portion with barriers movably attached to the back portion and front portion for selectively preventing access thereto.

What is needed in the art is a device that can independently obscure cameras and microphones on a smartphone.

SUMMARY OF THE INVENTION

Disclosed is a privacy device that attaches to the back side of a smartphone. The privacy device employs a hingedly attached lower flap to obscure a front bottom microphone and speaker. The lower flap includes an aperture that allows access to the lightning port while the flap is in a closed position. A hinged upper flap obscures the front top microphone, front facing camera, and a second speaker with the upper flap is in a closed position. A rear shield is slidably attached to the device to obscure the rear top microphone and rear facing camera. The flaps and shield include a soft rubber silicone gasket to enhance the privacy by sealing audio input from the microphones.

The privacy device allows selective openings. For instance, the lower hinged flap can be rotated into an open position wherein the user may communicate using the smartphone with visual privacy protection by concealing the cameras. The lower hinged flap may be closed, and the upper hinged flap may be opened wherein the user may communicate using the upper camera to face time another. The sliding shield may be opened wherein the user may take videos and collect sound, while the face time camera is obscured.

An objective of the invention is to provide a smartphone privacy device that inhibits others from listening or watching the smartphone user.

Still another objective of the invention is to a provide smartphone privacy device that does not inhibit conventional smartphone operation.

Another objective of the invention is to provide a privacy device for smartphone by use of flap and shield placement.

Still another objective of the invention is to teach the use of gasket positioning to insulate microphones on a smartphone to assure the smartphone will not be able to record conversations or other auditory stimuli in the area surrounding the smartphone.

Other objectives, advantages and benefits associated with this invention will be apparent to those skilled in the art from the description, examples and the claims which follow.

DETAILED DESCRIPTION OF THE PREFERRED EMBODIMENT

Figure 1:
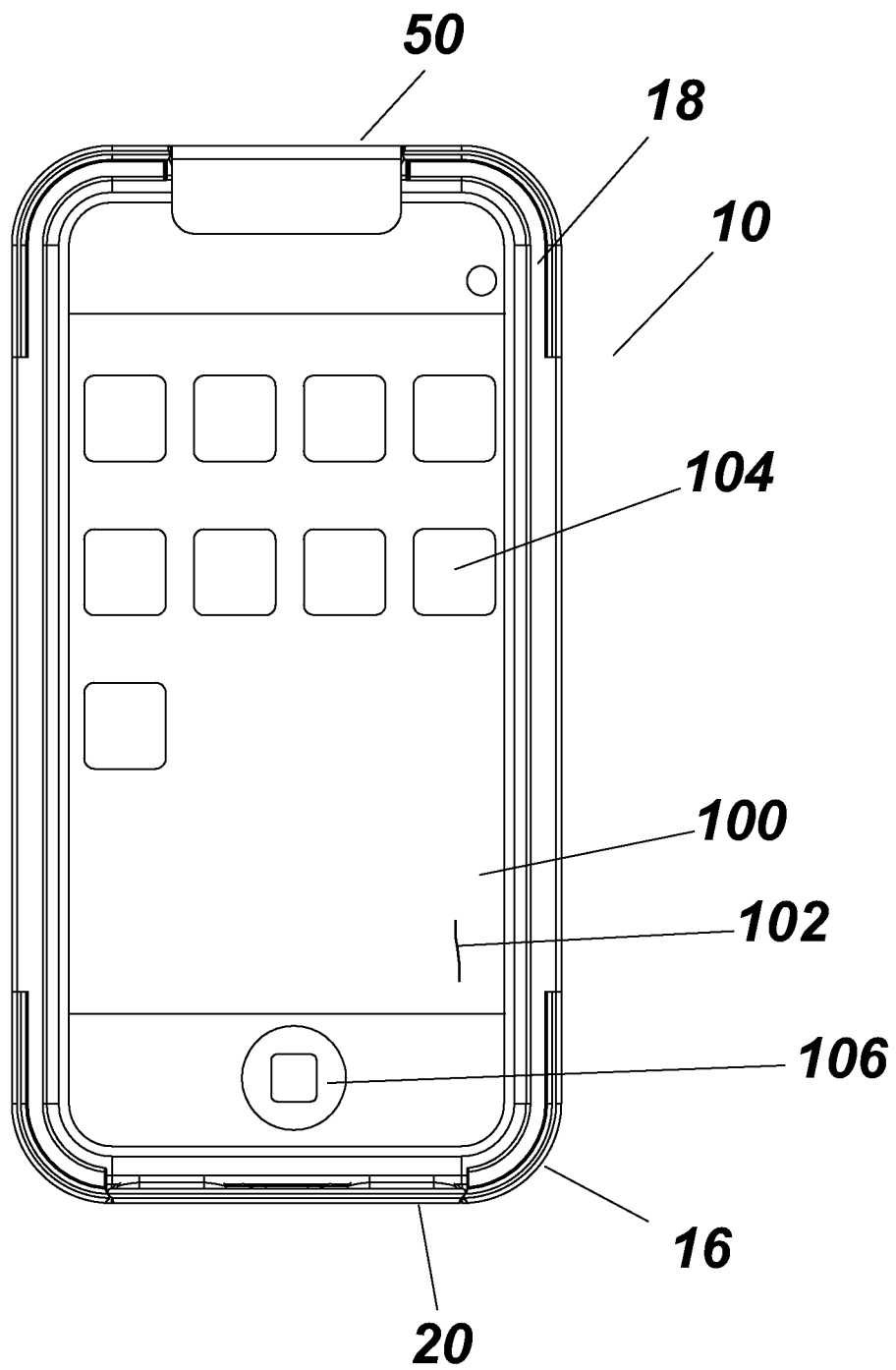
FIG. 1 is a top plane view of the smartphone privacy case coupled to a smartphone.

A detailed embodiment of the instant invention is disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring now to the figures, depicted is a privacy device 10 for a smartphone 100. In one embodiment, the smartphone is an iPhone having a multi-touch display 102 with application icons 104. A home button 106 is located along the bottom of the display face 102, with a bottom edge 108 that includes a first microphone 110, a first speaker 112, and a lightning port 114. An upper section 116 of the display 102 includes a second microphone 118 and a face time camera 120. The rear surface 125 of the smartphone includes an upper section 122 having cameras 124, a second microphone 127 and a lighting element 126. It is noted that while a particular smartphone is being illustrated, the privacy device 10 can be configured to hold any style smartphone having a flat face wherein speakers, microphones and cameras may be in different locations, but the teachings of this invention apply.

The privacy device 10 has a front face 12 and a rear face 125 bounded by U-shaped lower edge or side wall 16 and a U-shaped upper edge or side wall 18 forming a body member. The lower edge 16 is constructed and arranged to frictionally secure the smartphone 100 against the front face 12. A first side edge 21 is shaped to allow access to the left side edge of the smartphone, which in one embodiment holds the volume buttons, and a second side edge 23 to allow access to the right side of the smartphone, which in one embodiment holds the on/off button.

Figure 4:
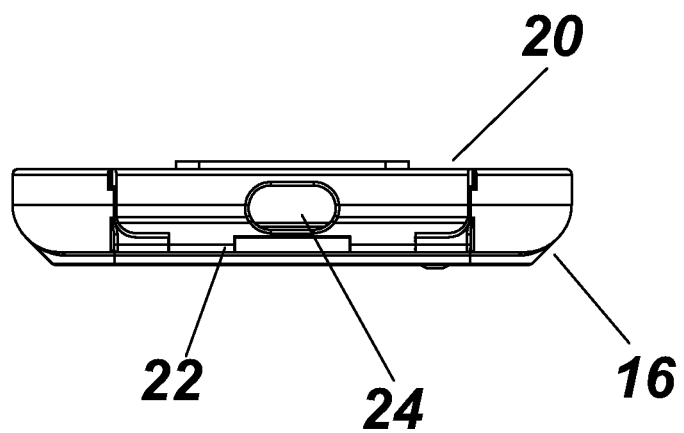
FIG. 4 is a lower end view with the lower flap closed.
Figure 5:
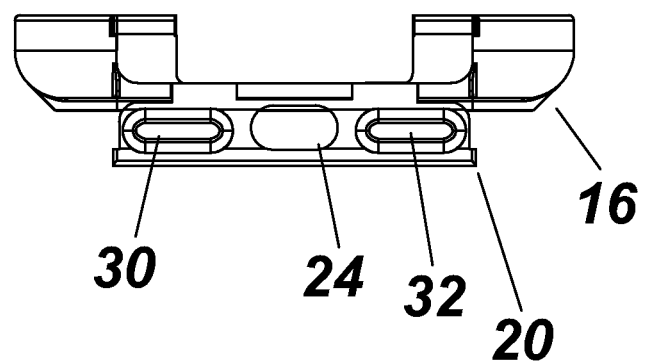
FIG. 5 is a lower end view with the lower flap open.
Figure 6:
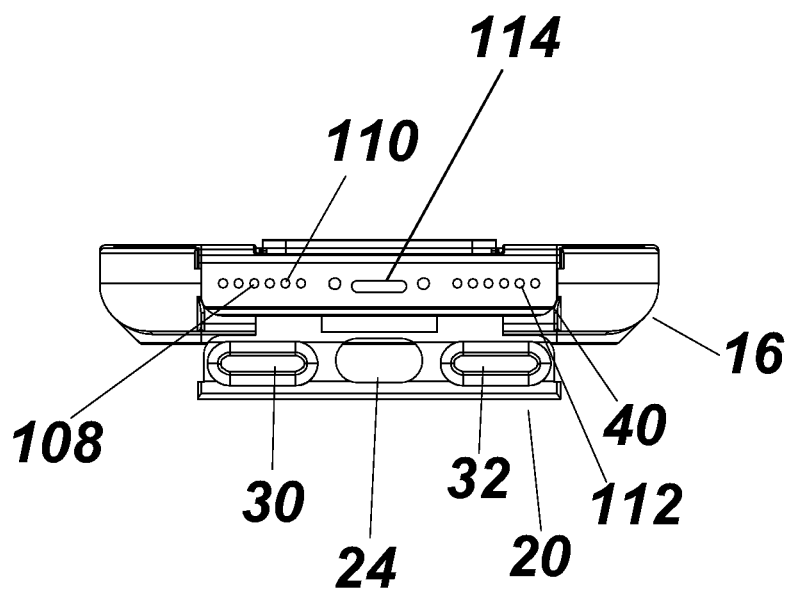
FIG. 6 is a lower end view with the lower flap open.

A lower flap 20 having an L-shape employs a hinge member 22 allowing rotatable attachment to the lower edge 16, wherein the lower flap 20 will overlay a lower portion of the smartphone display 102. The lower flap 20 has an aperture 24 to allow access to the lightning port 114 when the lower flap 20 is placed in a closed position, as illustrated in FIGS. 1 and 4. An inner surface 26 of the lower flap 20 includes a first gasket 30 formed of a soft rubber, preferably silicon, that seals the first microphone 110 when the lower flap 20 is in a closed position. A second gasket 32, also formed of the soft rubber, seals the first speaker 112 when the lower flap 20 is in a closed position. Access to the lightning port is possible when the lower flap 20 is placed in an open position; or through the aperture 24 when the lower flap 20 is placed in a closed position. In one embodiment, the hinge member 22 consists of a hinge pin 40 that extends from the lower side wall 16 through an opening formed in the lower flap 20. When the lower flap 20 is rotated into an open position, an individual can use the communication ports on the lower end in the customary manner. When the lower flap 20 is rotated into a closed position, the communication ports, namely the microphone 110 and speaker 112, are sealed by the gaskets 30 and 32. Should an individual accidentally trigger the communications port, any sound produced through speaker 112 will be muffled by the gasket 32. Similarly, sound will be muffled through the gasket 30 to the microphone 110. It should be noted that the gaskets can be made of various materials to provide a muffling effect, silicon rubber being the preferred embodiment.

Figure 2:
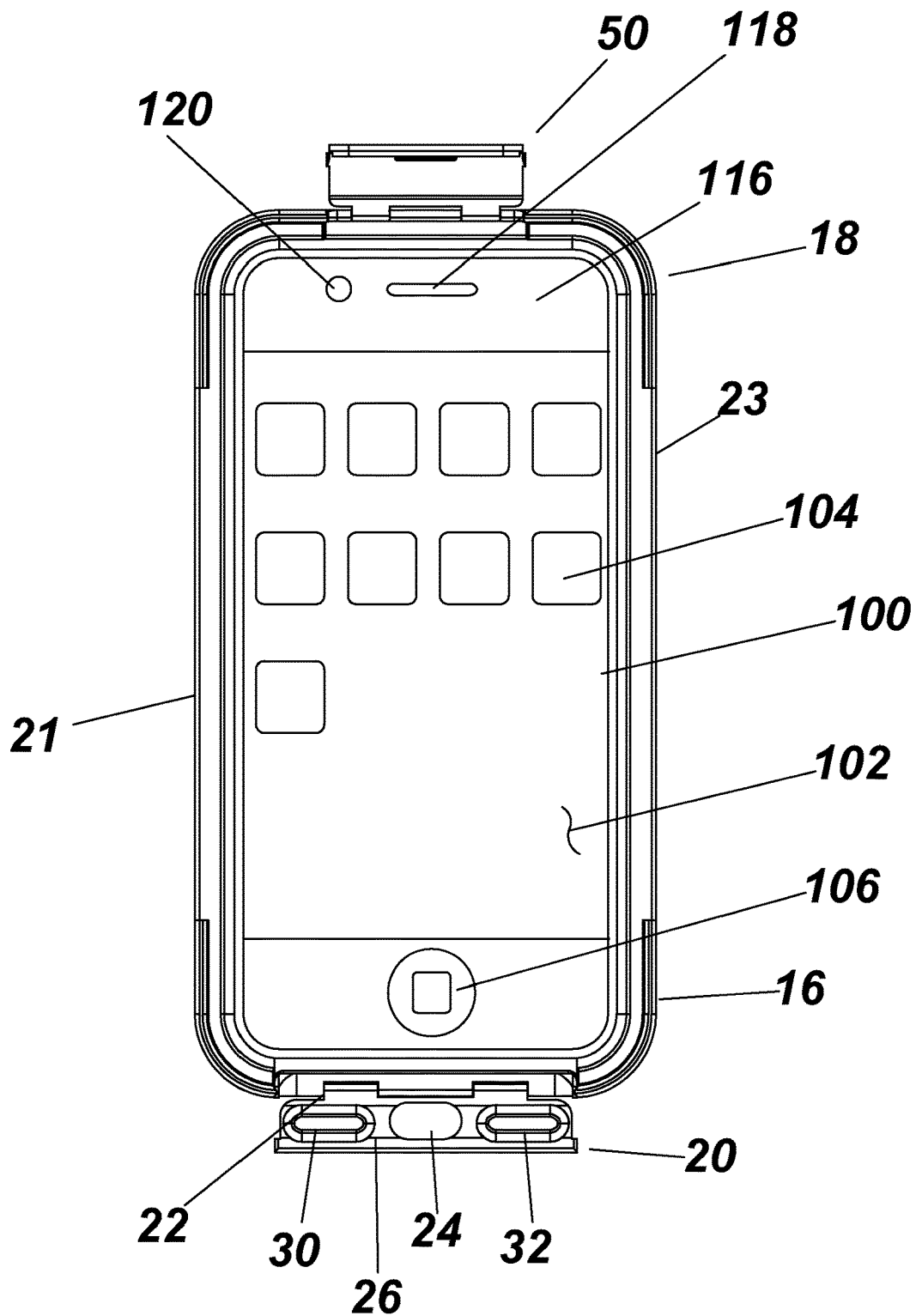
FIG. 2 is a top plane view of the smartphone privacy case illustrated in FIG. 1 with the lower and upper flaps open.
Figure 3:
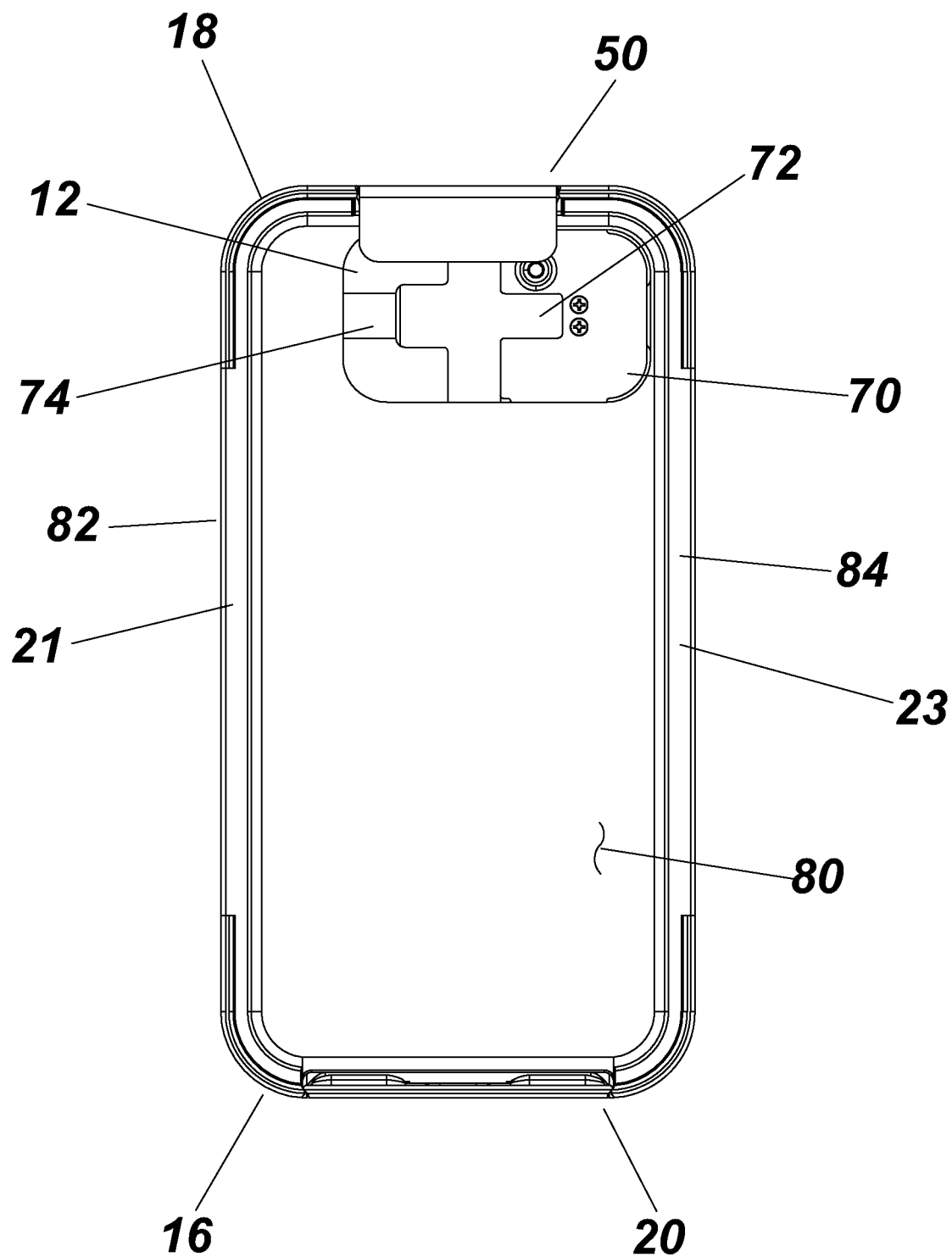
FIG. 3 is a top plane view of the smartphone privacy case illustrated in FIG. 1 with the smartphone removed.

An upper flap 50 having an L-shape employs a hinge member 52 allowing rotatable attachment to the upper side wall 18, wherein one side wall of the upper flap 50 will overlay an upper portion of the smartphone display face 102. The upper flap 50 is placed in a closed position as illustrated in FIG. 1, and an open position in FIG. 2. An inner surface 54 of the upper flap 50 includes a gasket 56 formed of a soft rubber, preferably silicon, that seals the second receiver 118 when the upper flap 50 is in a closed position. The upper flap 50 is sized to cover the face time camera 120 when the flap 50 is in a closed position. In one embodiment, the hinge member 52 consists of a hinge pin 58 that extends through a receptacle extending from the upper side wall 18 through an opening formed in the upper flap 50. When the upper flap 50 is rotated into an open position, as illustrated in FIG. 2, an individual can use the communication ports on the upper end in the customary manner. Face time is made possible through the camera 120 and second microphone 118. When the upper flap 50 is rotated into a closed position, as illustrated in FIG. 1, the communication ports, namely the face time camera 120 and microphone 118, are sealed by the gasket 56. Should an individual be hacked, the blockage of the camera 120 will protect the privacy of the smartphone user.

Figure 7:
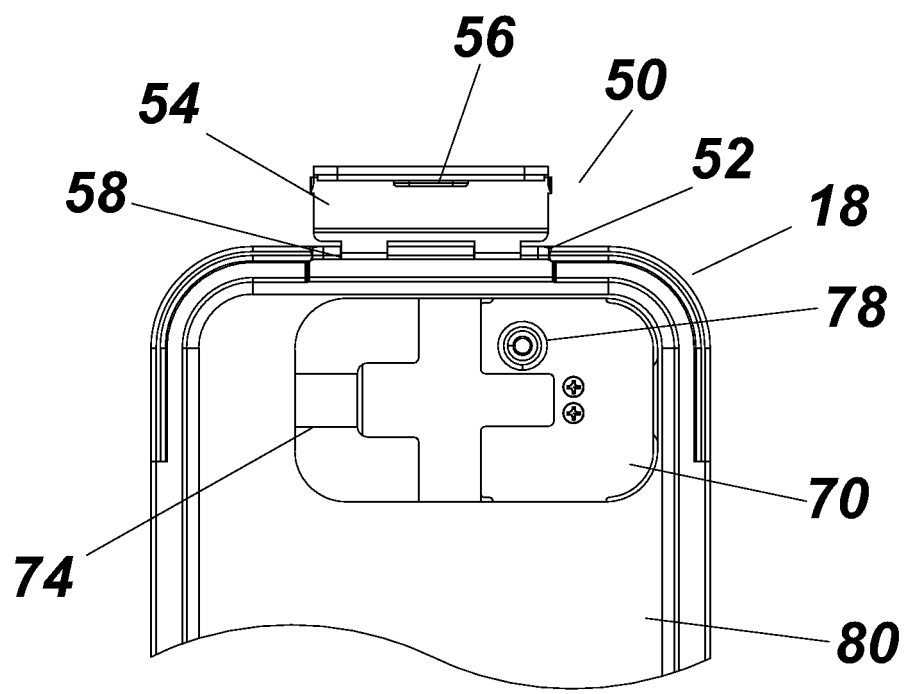
FIG. 7 is a top plane view of the upper end with the rear camera shield closed and, FIG. 8 is a top plane view of the upper end with the rear camera shield open.
Figure 8:
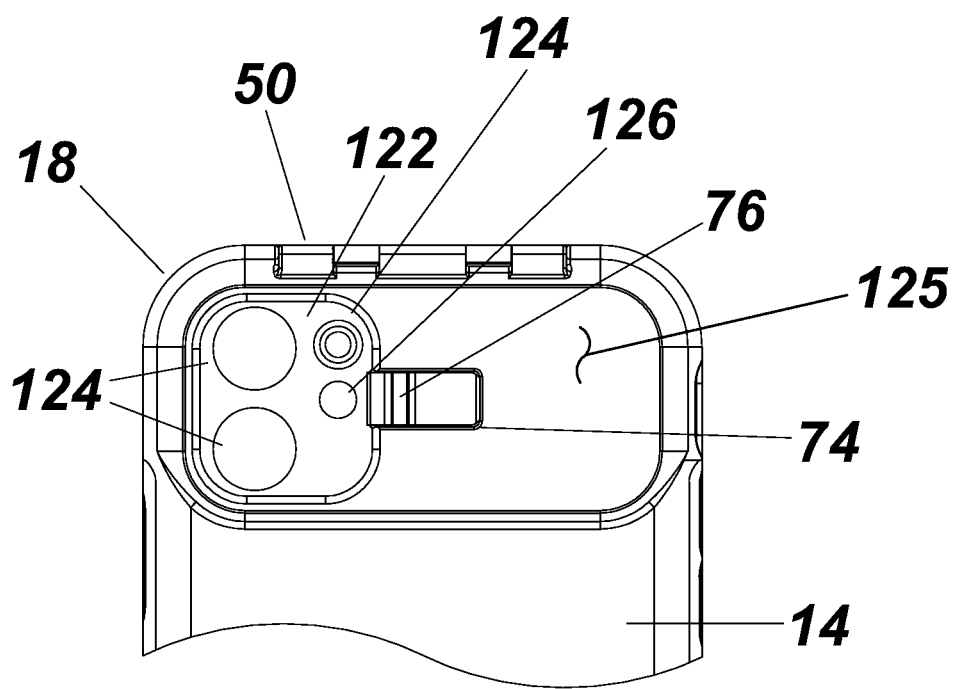

A shield 70 is slidably secured between the front face 12 and the rear face 14 of the privacy device 10. The shield 70 has a bracket 72 that slides within a track 74, allowing the shield 70 to move from a closed position as illustrated in FIG. 8 to an open position illustrated in FIG. 7. A grip member 76 allows for fingertip movement of the shield 70. When the shield 70 is in a closed position, the cameras 124, lighting element 126, and microphone 127 are blocked. In one embodiment a gasket member 78 may be used to conceal the microphone 127 on the rear face 125 of the smartphone 100. When the shield 70 is in an open position, as illustrated in FIG. 8, the rear facing cameras 124 and microphone 127 can be used in the ordinary manner. Further, the lighting element 126 may be used for photos or emergency lighting.

For additional sound buffering and protection of the smartphone from damage, a silicone rubber lining 80 that fits within the body member to provide a sound deadening of speaker produced sounds that may travel through the rear of the smartphone may be utilized. The lining 80 side walls 82 and 84 are flexible to allow operation of the smartphone volume controls and on/off control. A first side edge 21 of the device 10 is shaped to allow access to the left side edge of the smartphone 100 and is covered by the side wall 82; and a second side edge 23 allows access to the right side of the smartphone 100.

Selectively opening and closing the lower flap 20, upper flap 50 and shield 70 provides privacy by inhibiting someone listening through the microphones or watching through the cameras.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Furthermore, a device or structure that is configured in a certain way is configured in at least that way, but may also be configured in ways that are not listed.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A removable privacy device for a smartphone having a front face with a lower front microphone, an upper front microphone, a first camera, and a back face having an upper back microphone and a second camera, said front face spaced apart from said back face by an upper edge, a lower edge, a first side edge and a second side edge; the removable privacy device comprising:
    a body member for covering said back face, said body member having an upper end wall securable to the smartphone upper edge, a lower end wall securable to the smartphone lower edge, a first side wall securable to the smartphone first side edge, and a second side wall securable to the smartphone second side edge,
    a first flap hingedly secured to said lower end wall, said first flap having an L-shape constructed and arranged to rotate between a closed position for obscuring the lower front microphone of the smartphone, and an open position for conventional use of the lower front microphone, wherein said first flap includes an aperture to provide access to a lightning port while said first flap is in said closed position;
    a second flap hingedly secured to said upper end wall, said second flap having an L-shape constructed and arranged to rotate between a closed position for obscuring the upper front microphone and first camera, and an open position permitting the conventional use of the upper front microphone and first camera; and
    a shield defined by an inner surface and an outer surface, said inner surface including a silicone rubber gasket to obscure said upper rear microphone and said rear camera when said shield is in a closed position, said outer surface of said shield includes a grip member for ease of sliding said shield between the open and closed position, said shield slidably secured to said body member, said shield having a bracket constructed and arranged to slide within a track between a closed position for obscuring the upper back microphone and second camera, and an open position permitting the conventional use of the upper back microphone and second camera, wherein said body member includes a track for receipt of said shield;
    wherein said flaps and shield are selectively closed and opened to provide privacy from someone listening through the microphones or watching through the cameras.

2. The removable privacy device for a smartphone according to claim 1 wherein said first flap is L-shaped having an inner wall and an outer wall, said inner wall including a silicone rubber gasket to obscure the lower front microphone when said flap is in a closed position.

3. The removable privacy device for a smartphone according to claim 1 wherein said second flap is L-shaped having an inner wall and an outer wall, said inner wall including a silicone rubber gasket to obscure the upper front microphone and first camera when said flap is in a closed position.

4. The removable privacy device for a smartphone according to claim 1 wherein an inner surface of said body member is lined with a rubber lining.

5. The removable privacy device for a smartphone according to claim 4 wherein said rubber lining is constructed and arranged to allow operation of push button controls placed on the side edges of the smartphone.

* * * * *